(12) United States Patent
Wiesbauer et al.

(10) Patent No.: US 9,945,746 B2
(45) Date of Patent: Apr. 17, 2018

(54) MOTION DETECTION USING PRESSURE SENSING

(71) Applicant: Infineon Technologies AG, Neubiberg (DE)

(72) Inventors: Andreas Wiesbauer, Poertschach (AT); Christian Mandl, Munich (DE); Andreas Kopetz, Munich (DE); Roland Helm, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/461,771

(22) Filed: Mar. 17, 2017

(65) Prior Publication Data

US 2017/0191894 A1    Jul. 6, 2017

Related U.S. Application Data

(62) Division of application No. 14/323,306, filed on Jul. 3, 2014, now Pat. No. 9,631,996.

(51) Int. Cl.
| | |
|---|---|
| G01L 13/02 | (2006.01) |
| H04R 23/00 | (2006.01) |
| G01L 15/00 | (2006.01) |
| H04R 19/04 | (2006.01) |

(52) U.S. Cl.
CPC ............ *G01L 13/025* (2013.01); *G01L 15/00* (2013.01); *H04R 19/04* (2013.01); *H04R 23/00* (2013.01); *H04R 2201/003* (2013.01)

(58) Field of Classification Search
CPC ....... G01L 13/025; G01L 15/00; H04R 23/00; H04R 2201/003; H04R 19/04
See application file for complete search history.

(56) References Cited

U.S. PATENT DOCUMENTS

| | | |
|---|---|---|
| 4,131,088 A | 12/1978 | Reddy |
| 4,829,813 A | 5/1989 | Syed |
| 6,691,579 B2 | 2/2004 | Orr et al. |
| 9,164,118 B2 * | 10/2015 | Sato .................... G01P 1/02 |
| 9,322,685 B2 | 4/2016 | Ray |
| 2008/0218934 A1 | 9/2008 | Langereis et al. |
| 2012/0020485 A1 | 1/2012 | Visser et al. |
| 2014/0226838 A1 | 8/2014 | Wingate et al. |
| 2015/0276529 A1 * | 10/2015 | Wiesbauer ............ B81B 3/0021 73/724 |

(Continued)

FOREIGN PATENT DOCUMENTS

| | | |
|---|---|---|
| CN | 1836174 A | 9/2006 |
| CN | 1942749 A | 4/2007 |
| CN | 101855914 A | 10/2010 |

(Continued)

OTHER PUBLICATIONS

Ma et al., "A MEMS-Based Flow Direction Sensing Platform with Integrated Temperature Compensation Scheme," Sensors 2009, revised Jun. 26, 2009, 17 pages.

*Primary Examiner* — David Ton
(74) *Attorney, Agent, or Firm* — Slater Matsil, LLP (57) ABSTRACT

According to an embodiment, a method of sensing motion includes receiving a first signal from a first pressure sensor and a second signal from a second pressure sensor, comparing the first signal and the second signal, and characterizing a motion based on the comparing.

20 Claims, 9 Drawing Sheets

(56) References Cited

U.S. PATENT DOCUMENTS

2016/0223579 A1    8/2016  Froemel et al.

FOREIGN PATENT DOCUMENTS

| CN | 101978337 | A | 2/2011 |
|---|---|---|---|
| CN | 102670207 | A | 9/2012 |
| CN | 103386191 | A | 11/2013 |
| JP | H07311106 | A | 11/1995 |
| JP | 2009507656 | A | 2/2009 |
| JP | 2011195282 | A | 10/2011 |
| KR | 20130055650 | | 5/2013 |

\* cited by examiner

MOTION DETECTION USING PRESSURE SENSING

CROSS-REFERENCE TO RELATED APPLICATIONS

This application is a divisional of U.S. patent application Ser. No. 14/323,306, filed on Jul. 3, 2014, and entitled "Motion Detection Using Pressure Sensing," which application is hereby incorporated herein by reference.

TECHNICAL FIELD

The present invention relates generally to pressure sensing, and, in particular embodiments, to a system and method for motion detection using pressure sensing.

BACKGROUND

Transducers that convert signals from one domain to another are often used in sensors. A common sensor that includes a transducer is a pressure sensor that converts pressure differences and/or pressure changes to electrical signals. Pressure sensors have numerous applications including, for example, atmospheric pressure sensing, altitude sensing, and weather monitoring.

Microelectromechanical system (MEMS) based sensors include a family of transducers produced using micromachining techniques. MEMS, such as a MEMS pressure sensor, gather information from the environment by measuring the change of physical state in the transducer and transferring the signal to be processed by the electronics, which are connected to the MEMS sensor. MEMS devices may be manufactured using micromachining fabrication techniques similar to those used for integrated circuits.

MEMS devices may be designed to function as oscillators, resonators, accelerometers, gyroscopes, pressure sensors, microphones, and/or micro-mirrors, for example. Many MEMS devices use capacitive sensing techniques for transducing the physical phenomenon into electrical signals. In such applications, the capacitance change in the sensor is converted to a voltage signal using interface circuits.

Pressure sensors may also be implemented as capacitive MEMS devices that include a sealed volume and a deflectable membrane. A pressure difference between the sealed volume and an external volume, such as the ambient environment in some cases, causes the membrane to deflect. Generally, the deflection of the membrane causes a change in distance between the membrane and a sensing electrode, thereby changing the capacitance.

SUMMARY

According to an embodiment, a method of sensing motion includes receiving a first signal from a first pressure sensor and a second signal from a second pressure sensor, comparing the first signal and the second signal, and characterizing a motion based on the comparing.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely motion sensing, and more particularly, motion sensing using pressure sensors. Some of the various embodiments described herein include MEMS transducer systems, MEMS microphone systems, static and dynamic pressure sensors, and motion sensing along multiple axes using multiple pressure sensors. In other embodiments, aspects may also be applied to other applications involving any type of sensor or transducer for detecting any kind of motion or pressure change according to any fashion as known in the art.

Motion detection is prevalent in electronic systems with accelerometers and gyroscopes being used in countless systems to provide such motion detection. For example, automobiles use accelerometers to sense rapid accelerations or decelerations to trigger air bags; cell phones and tablet computers use accelerometers and gyroscopes to determine phone position and align the screen orientation, to control games, and to generally enable additional functionality; and numerous other applications including electronic toys, video game controllers and systems, computer peripherals, assorted devices, and machines use accelerometers and gyroscopes individually or in combination to provide countless functionalities related to motion detection and analysis.

According to various embodiments, motion detection is performed with pressure sensors. Various embodiment pressure sensors are arranged facing different directions and configured to preferentially detect pressure waves in primary directions aligned with each respective pressure sensor. In an embodiment, three pressure sensors are arranged orthogonally and configured to preferentially sense pressures from the surrounding medium corresponding to velocity in a specific direction. The pressure signals may be filtered and a difference signal may be generated in order to determine the direction of motion. In various embodiments, the pressure sensors used may be microphones, dynamic pressure sensors, or static pressure sensors. Further, the sound port or pressure port connecting the respective pressure sensor to the surrounding medium may include a directionally preferential guide or other structure, similar to a pitot tube, for example. Each pressure sensor includes a microfabricated diaphragm or membrane arranged with a planar surface having a normal pointing in a primary direction of movement for the respective sensor. Various embodiments and modifications are described herein.

Figure 1:
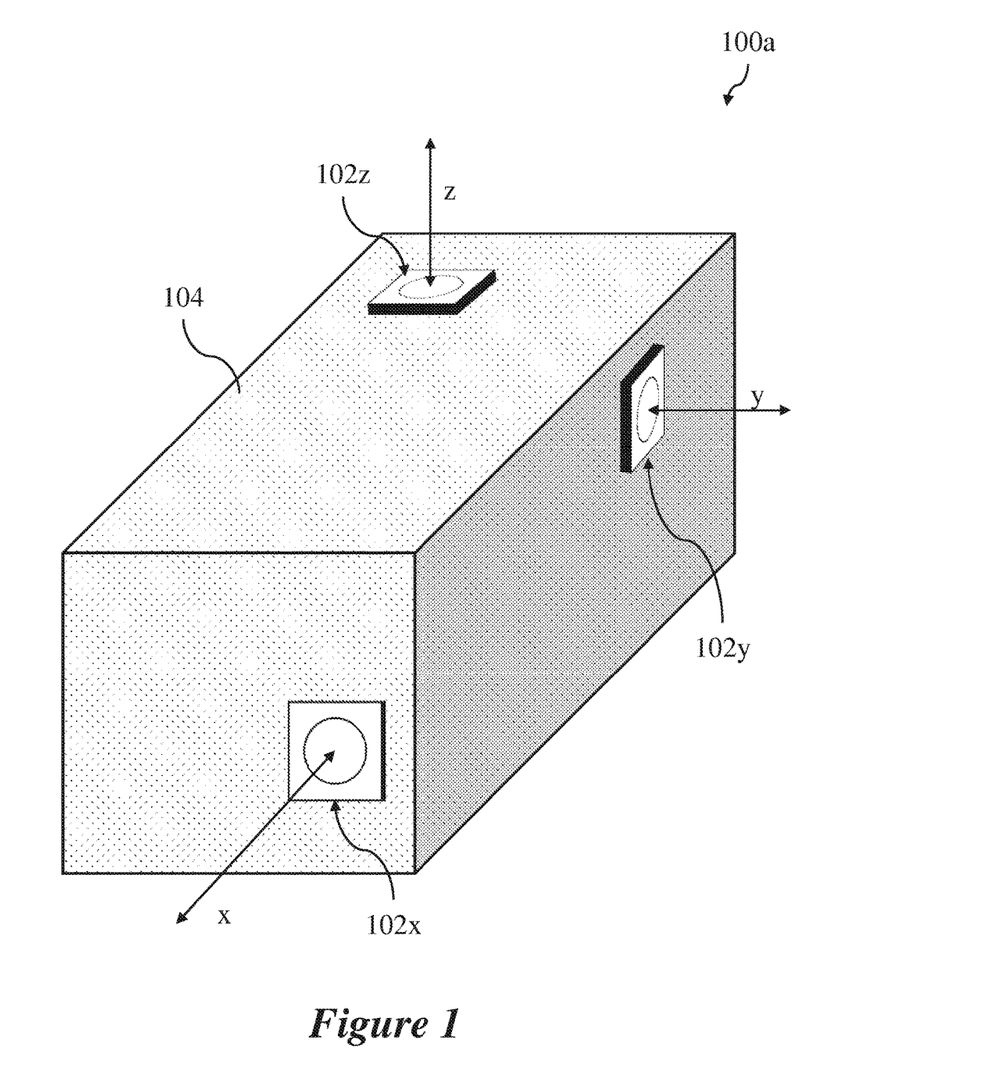
FIG. 1 illustrates a perspective view of an embodiment motion sensor.

FIG. 1 illustrates a perspective view of an embodiment motion sensor bow including three pressure sensors 102 arranged orthogonally on device 104. According to various embodiments, device 104 may be any type of device that incorporates motion sensing such as an automobile, a portion or an automobile, a mobile phone, a tablet computer, a computer, a computer peripheral such as a mouse, a video game console, a video game controller, sporting equipment such as a football helmet, or any other device. Each pressure sensor 102x, 102y, 102z is coupled to the surrounding medium, e.g., air, through a sound port or pressure port and includes a sensing surface arranged with a normal pointing parallel to the x-axis, y-axis, and z-axis, respectively. When device 104 is moved along any axis, the corresponding pressure sensor 102x, 102y, or 102z senses a pressure change while the other pressure sensors arranged orthogonal to the motion do not sense a pressure change, or sense a small pressure change. If device 104 is moved diagonally to any axis, a processing circuit may compare the generated pressure signals from each pressure sensor 102x, 102y, 102z, remove common components, and determine the velocity direction or velocity magnitude. In various embodiments, the pressure change sensed during a motion is proportional to the velocity of the motion and the fluid incident on the respective pressure sensor. Due to changes of altitude or environmental activity, such as opening and closing of doors, for example, typically all pressure sensors experience approximately the same signal. In various embodiments, common components may be extracted and cancelled by the processing circuit, which may include a signal processor.

In various embodiments, device 104 includes or is coupled to a processing circuit (not shown) that is coupled to each pressure sensor 102. The processing circuit may include a band pass filter or a low pass filter. The three pressure sensors 102x, 102y, 102z may each be identical or each may be different. In various embodiments, pressure sensors 102x, 102y, 102z are microphones or MEMS microphones, dynamic pressure sensors, or static pressure sensors. Each pressure sensor may include a pitot tube or other directionally preferential structure on the pressure port to decrease the orthogonal direction sensitivity in each respective pressure sensor. In particular embodiments, dynamic pressure sensors are used as described in co-pending patent application Ser. No. 14/231,068 entitled "Dynamic Pressure Sensor" and filed Mar. 31, 2014, which is incorporated herein in its entirety.

In various embodiments, motion sensor 100a includes only a single pressure sensor 102 or only two pressure sensors 102. In some embodiments, device 104 may be a device that exhibits a reproducible motion. For example, device 104 may include a lever, hinged lid, such as for a laptop computer, or other movable portion that undergoes a reproducible motion. In such embodiments, a single pressure sensor 102 may be affixed to device 104 and configured to detect the reproducible motion. The pressure sensor may be coupled to a band pass filter or a low pass filter.

Figure 2:
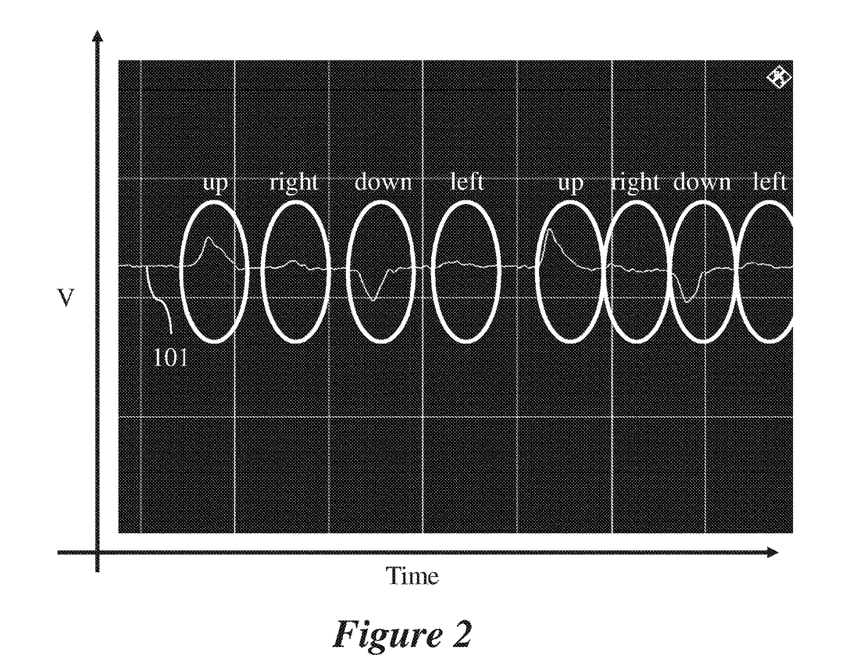
FIG. 2 illustrates a waveform diagram of example motion detection signals in an embodiment motion sensor.

FIG. 2 illustrates a waveform diagram of example motion detection signals in an embodiment motion sensor, such as device 104 in FIG. 1. Pressure signal 101 depicts a single measured and transduced pressure signal as a device undergoes various movements. According to various embodiments, as the device moves up or down, which in this case correspond to motions aligned with the sensor producing pressure signal 101, a detectable signal peak is generated. When the device moves right or left, which corresponds to motions orthogonal to the sensor producing pressure signal 101, little or no signal is generated. In various embodiments, such pressure signals from multiple sensors may be used to detect movements in any direction. In some embodiments, the combinations of pressure signals may be used to differentiate between ambient pressure changes, sounds, and motion. For example, pressure signals detected simultaneously at three sensors may correspond to an ambient air pressure change or sound pressure signal.

Figure 3:
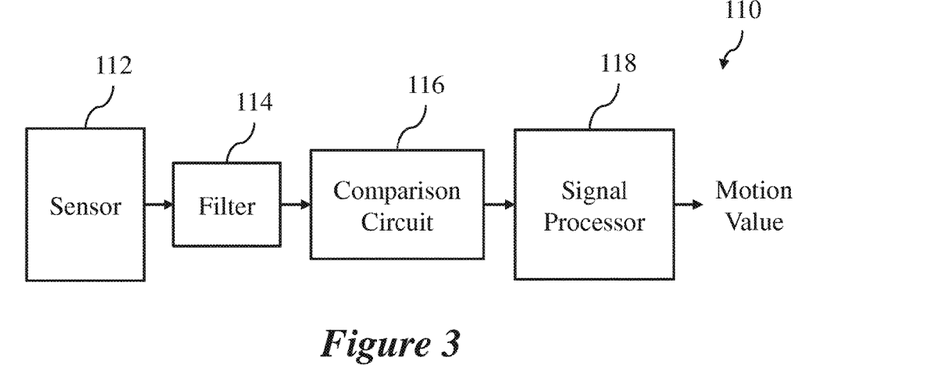
FIG. 3 illustrates a functional block diagram of an embodiment motion sensor system.

FIG. 3 illustrates a functional block diagram of an embodiment motion sensor system no including sensor 112, filter 114, comparison circuit 116, and signal processor 118. According to various embodiments, sensor 112 includes orthogonally placed pressure sensors, such as dynamic pressure sensors or MEMS microphones, for example, configured to detect pressure signals preferentially in different directions. Sensor 112 generates transduced pressure signals and supplies the generated pressure signals to filter 114 for filtering. In various embodiments, filter 114 applies a low pass filter (LPF) or a band pass filter (BPF) to the pressure signals. Filter 114 may be applied in order to filter out non-movement related pressure signals such as sound waves or ambient pressure changes. The filtered pressure signals are supplied to comparison circuit 116 that compares the pressure signals originating from different pressure sensors. For example, sensor 112 may detect multiple pressure waves or variations, but comparison circuit 116 may remove components of the pressure signals common to more than one pressure signal in order to isolate specific movement directions. In some embodiments, comparison circuit 116 may include a difference circuit that calculates a difference signal between the pressure signals originating from any number of different pressure sensors. Signal processor 118 receives the difference signals and may perform further calculation to generate a motion value corresponding to velocity direction. The motion value may also include velocity magnitude, dependent on signal processor 118. Signal processor 118 may perform a comparison or difference operation. In such embodiments, comparison circuit 116 may be omitted. In various other embodiments, comparison circuit 116 or signal processor 118 may implement further, more advanced, algorithms to evaluate motion information.

In various embodiments, the LPF may have a high frequency roll-off frequency of 100 Hz, passing frequencies below 100 Hz. In more particular embodiments, the LPF may only pass frequencies below 10 Hz. The BPF may pass a band between 0.5 and 100 Hz, between 0.5 and 10 Hz, or between 1 and 10 Hz in some specific embodiments. Sensor 112 may include multiple sensors arranged in different directions or locations, such as orthogonally or approximately orthogonally. For example, sensor 112 may include two pressure sensors, three pressure sensors, or more than three pressure sensors. In an alternative embodiment, sensor 112 includes only a single pressure sensor attached to a structure.

According to various embodiments, difference circuit 116 and signal processor may be implemented in numerous different ways, for example, using analog or digital integrated circuits, a single microprocessor or multiple microprocessors, an application processor, or some combination thereof. In such embodiments, difference circuit 116 and signal processor 118 are not necessarily separate components, but may be fully or partially integrated as well.

Figure 4:
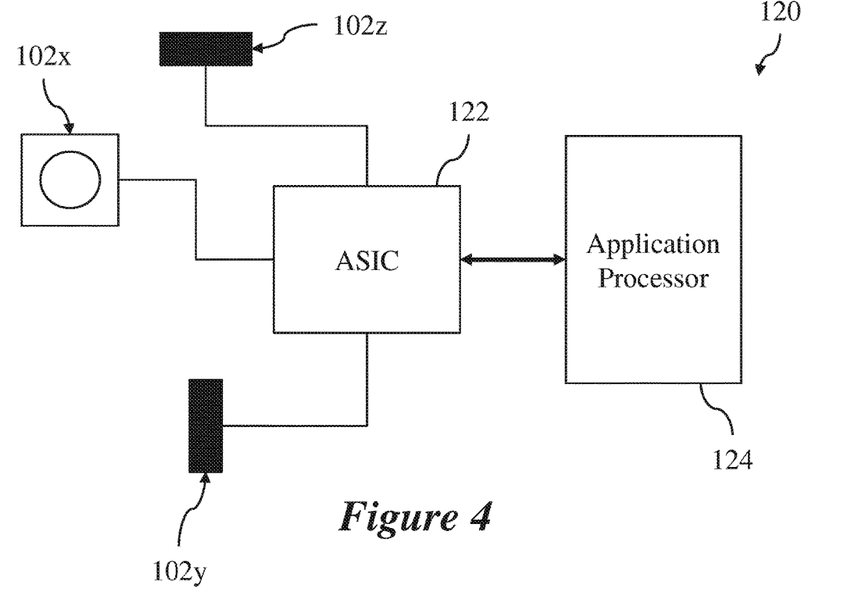
FIG. 4 illustrates a system block diagram of an embodiment motion sensor system.

FIG. 4 illustrates a system block diagram of an embodiment motion sensor system 120 including three pressure sensors 102x, 102y, and 102z, application specific integrated circuit (ASIC) 122, and application processor 124. According to various embodiments, motion sensor system 120 implements one embodiment of motion sensor system no. ASIC 122 receives transduced pressure signals from pressure sensors 102x, 102y, 102z and performs initial processing. For example, ASIC 122 may amplify and filter each signal. Additionally, ASIC 122 may calculate a difference signal based on the transduced signals. Application processor 124 receives the initially processed signals from ASIC 122 and performs additional signal processing. In some embodiments, application processor 124 calculates the difference signal based on the individual pressure signals. Application processor 124 also performs further signal processing in order to detect and characterize movements. For example, application processor 124 calculates a velocity vector including the magnitude and direction of detected and characterized movements. Application processor 124 may also perform numerous other calculations and may be connected to a data bus or interface for various electronic devices or systems.

Figure 5:
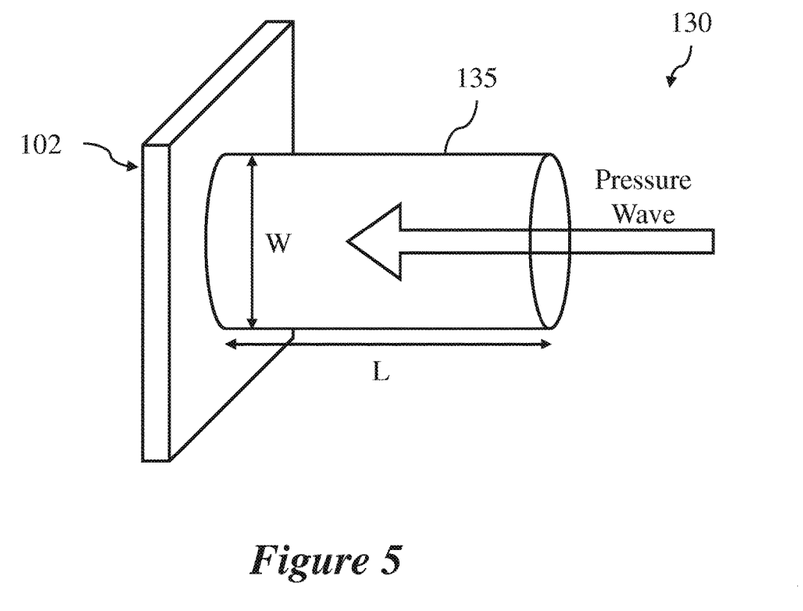
FIG. 5 illustrates a perspective view of an embodiment pressure sensor structure including an embodiment sensor to air interface.

FIG. 5 illustrates a perspective view of an embodiment pressure sensor structure 130 including an embodiment sensor to air interface with a pressure sensor 102 and a pressure port 135. According to various embodiments, pressure port 135 may be a long sound or pressure port coupled to a pressure sensor, such as MEMS microphone or a dynamic pressure sensor. Pressure port 135 may have a width W, or diameter, and a length L. In such embodiments, the pressure sensor 102 includes a microfabricated deflectable diaphragm or membrane formed with a sensing structure for detecting deflections of the membrane. The deflectable membrane may have a planar surface with a diameter or long dimension approximately equal to or near the width W of pressure port 135. In various embodiments, length L is greater than width W. In particular embodiments, length L may be at least three times greater than width W. In one specific embodiment, length L is at least ten times greater than width W.

In various embodiments, pressure port 135 is operable to allow pressure waves to reach the membrane of pressure sensor 102 when the pressure waves incident on the membrane are parallel to the normal of the planar surface of the membrane. Pressure port 135 allows pressure waves to pass lengthwise through the port. However, pressure port 135 is operable to block or limit pressure waves traveling perpendicular to the normal of the planar surface of the membrane. Such pressure waves are limited from entering pressure port 135 due to the angle of incidence on the opening. Pressure waves incident at a diagonal angle, neither perpendicular nor parallel to the planar surface of the membrane, are partially blocked, thereby allowing a portion of the pressure wave to pass through pressure port 135.

In other embodiments, pressure port 135 may be any shape including, for example, circular, square, or other cross sections, or even tapered and/or bent structures. Further, more detailed, explanations of embodiment pressure sensors with similar features as pressure sensor structure 130 are described below in reference to FIGS. 8, 9, 10a, and 10b.

Figure 6:
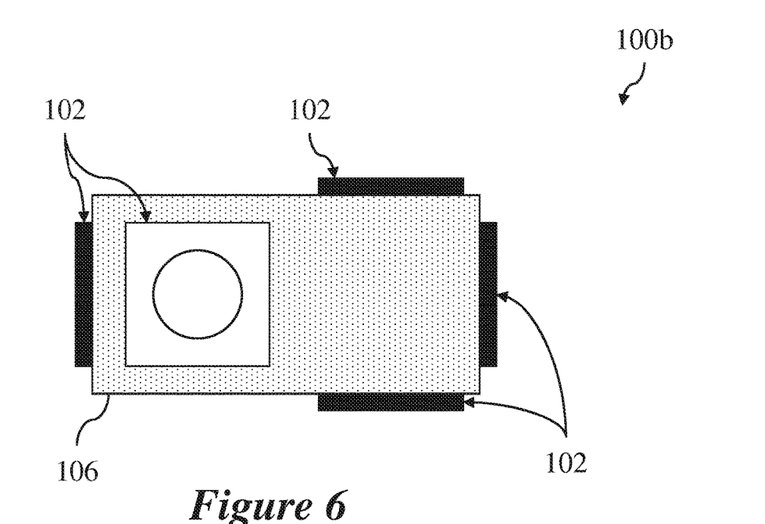
FIG. 6 illustrates a side view of another embodiment motion sensor.

FIG. 6 illustrates a side view of another embodiment motion sensor 100b including six sided device 106 and at least six pressure sensors 102. According to various embodiments, device 106 may be any type of device that incorporates motion sensing as described in reference to device 104 in FIG. 1. Pressure sensors 102 are attached or included on each side of device 106 in order to increase pressure signal detection. Device 106 includes or is coupled to processing circuits for analyzing the signals originating from pressure sensors 102 as described in reference to FIGS. 1, 3, and 4. In such embodiments, additional signal processing may be applied to the transduced pressure signals for comparison purposes to improve motion detection and characterization.

Figure 7:
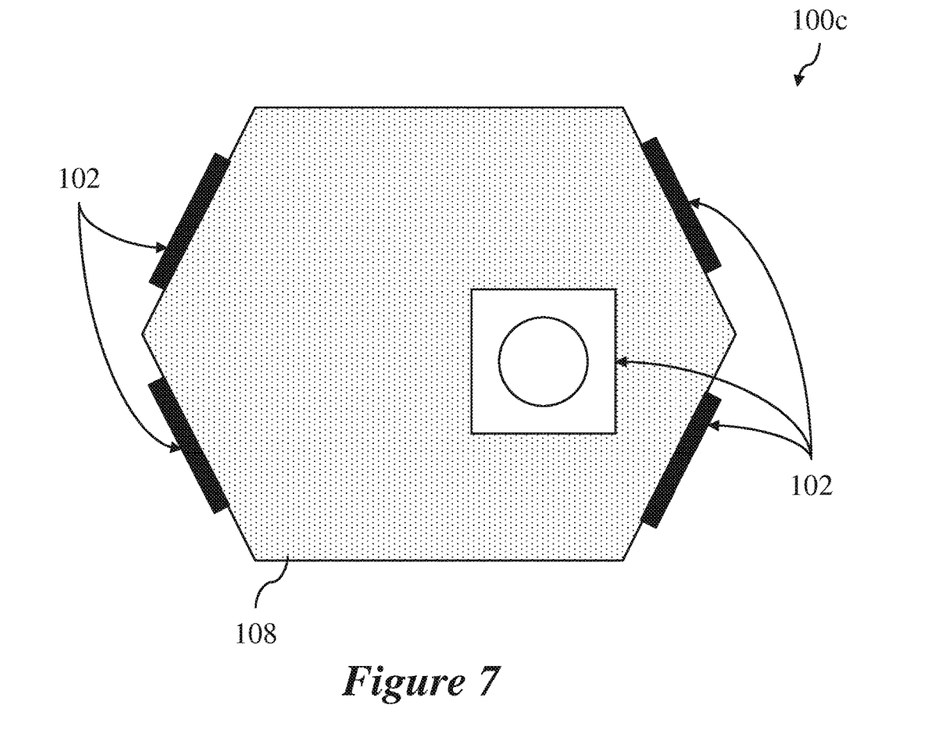
FIG. 7 illustrates a side view of a further embodiment motion sensor.

FIG. 7 illustrates a side view of a further embodiment motion sensor 100c including eight sided device 108 and at least six pressure sensors 102. According to various embodiments, motion sensor 100c and device 108 are similar to motion sensor 100a and 100b as described in reference to FIGS. 1 and 6 above. These structures are shown to be illustrative of numerous shapes and configurations of pressure sensors 102 in various embodiments. A device, such as device 108, may have many sides and include pressure sensors 102 on any of the sides. Pressure sensors 102 are arranged to preferentially sense pressure waves in specific directions. Processing circuits, such as described in reference to FIGS. 3 and 4, use the transduced signals to detect and characterize the corresponding movements. In various embodiments, many pressure sensors 102 may be arranged in any number different directions and coupled to the processing circuits described in reference to FIGS. 3 and 4.

Figure 8:
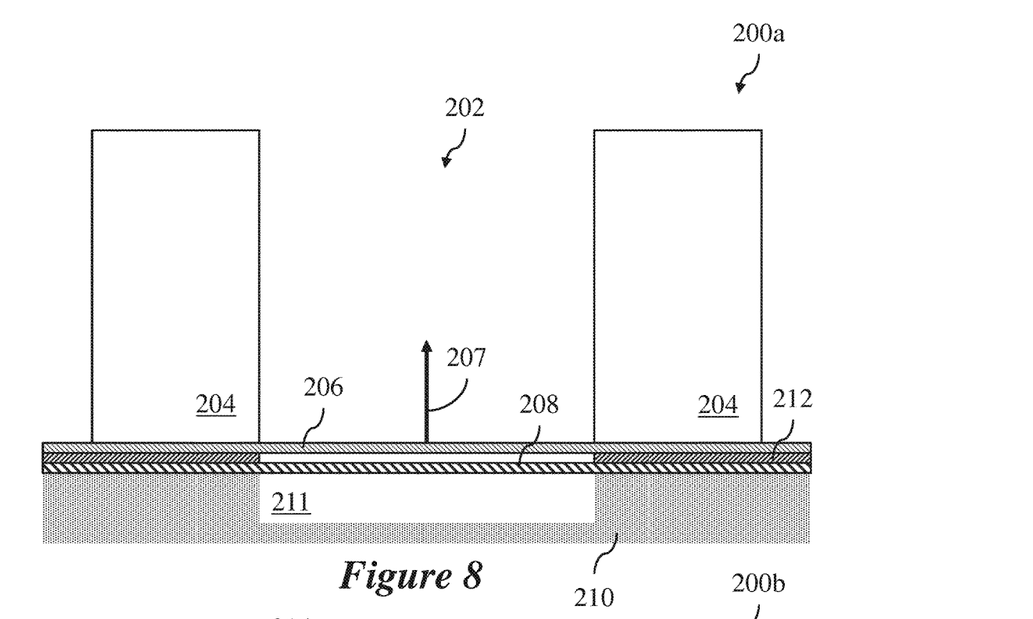
FIG. 8 illustrates a cross-sectional view of an embodiment pressure sensor structure.

FIG. 8 illustrates a cross-sectional view of an embodiment pressure sensor structure 200a including pressure port 202, guide structure 204, sensing membrane 206, and sensing structure 208. According to various embodiments, pressure waves enter through pressure port 202 in the direction of membrane 206 and cause membrane 206 to deflect. Sensing structure 208 detects and measures the deflection of membrane 206 and electrical leads (not shown) provide transduced pressure signals from membrane 206 and sensing structure 208 to processing circuits (not shown), such as an integrated circuit or an application processor, for example, as described in reference to FIGS. 3 and 4. Pressure port 202 may be formed as an opening in guide structure 204. Similar to the embodiments described in reference to FIG. 5, pressure port 202 and guide structure 204 guide pressure waves toward membrane 206. In various embodiments, pressure port 202 may allow or guide pressure waves traveling parallel, or approximately parallel, to normal 207 of the surface of membrane 206. Conversely, pressure port 202 may limit or prevent pressure waves traveling perpendicular, or approximately perpendicular, to normal 207. Thus, in such embodiments, pressure port 202 preferentially receives pressure waves traveling parallel to normal 207 and rejects pressure waves traveling perpendicular to normal 207.

In various embodiments, pressure sensor structure 200a is a microfabricated device, such as a MEMS sensor. In some embodiments, pressure sensor structure 200a is a MEMS dynamic pressure sensor or a MEMS static pressure sensor.

In other embodiments, pressure sensor structure 200a is a MEMS microphone. According to various embodiments, membrane 206 is a deflectable membrane formed on and supported by spacer 212, which is formed on sensing structure 208. Sensing structure 208 may be a perforated backplate. Substrate 210 provides the support structure for sensing structure 208 and membrane 206 and includes a cavity 211.

In an embodiment, substrate 210 is a silicon substrate and sensing structure 208 and membrane 206 are doped polysilicon layers. In other embodiments, substrate 210 may be any semiconductor material, polymer, or the like. Membrane 206 and sensing structure 208 may be formed of any conductive material, such as metals, e.g., aluminum, or conductive compounds, for example. Membrane 206 or sensing structure 208 may also be formed of multiple layers, such as a non-conductive structural layer and a conductive layer. For example, membrane 206 or sensing structure 208 may be formed of an insulator or dielectric, such as an oxide or nitride, and may be coated with a metal layer, such as gold. Sensing structure 208 and membrane 206 are formed as a parallel plate capacitor with a separation distance that varies as membrane 206 deflects in response to incident pressure waves.

In various embodiments, guide structure 204 may be an attached component or may be formed through in the microfabrication process. Guide structure 204 is formed of a polymer and attached to the microfabricated structure of membrane 206, sensing structure 208, and substrate 210 in one embodiment. Guide structure 204 is formed of a device package, including plastic, metal, or a printed circuit board (PCB), for example, and the microfabricated structure is attached in another embodiment. Guide structure 204 may be any shape, such as square or circular cylinder, for example. For further details and embodiments regarding various materials and structures relating to a MEMS microphone or a dynamic pressure sensor, refer to co-pending patent application Ser. No. 14/231,068, as discussed above. Further embodiments related to pressure sensor structure 200a are described in reference to FIGS. 9, 10a, and 10b below. Corresponding numerals have corresponding structure and description of corresponding elements described in reference to FIG. 8 is not repeated in reference FIGS. 9, 10a, and 10b.

Figure 9:
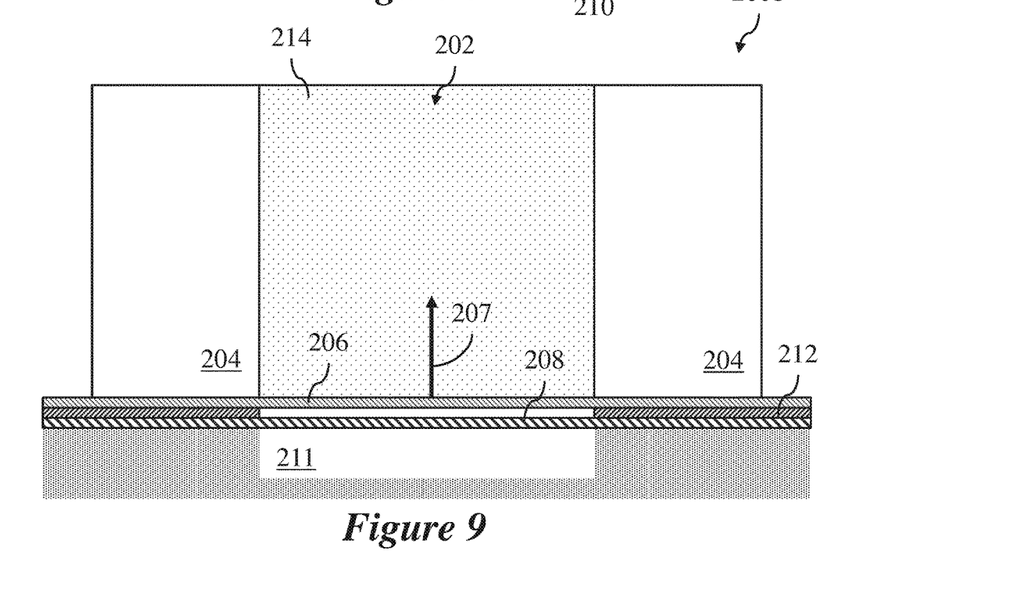
FIG. 9 illustrates a cross-sectional view of another embodiment pressure sensor structure.

FIG. 9 illustrates a cross-sectional view of another embodiment pressure sensor structure 200b including pressure port 202, filed with foam 214, guide structure 204, sensing membrane 206, and sensing structure 208. According to various embodiments, foam 214 may be included in pressure port 202 in order to filter sound pressure waves entering pressure port 202. Foam 214 may serve as a type of filter, removing higher frequency signals and also reducing some movement related pressure waves. For example, foam 214 may reduce or limit pressure waves caused by horizontal movements in reference to the direction of pressure port 202 (i.e. may limit pressure waves from movements perpendicular to normal 207). In some embodiments, foam 214 includes packaging foam or audio foam, as is commonly available. Foam 214 may be included in a MEMS microphone in some embodiments and may be applied across or within the sound port of a MEMS microphone. Foam 214 may serve as an additional low pass filter (LPF) and may be combined with a circuit implementation of an LPF as described in reference to FIGS. 3 and 4 above. Foam 214 may allow ambient pressure changes to be sensed. In such embodiments, additional signal processing or filtering may be performed to distinguish between motion induced pressure signals and ambient pressure changes.

Figure 10A:
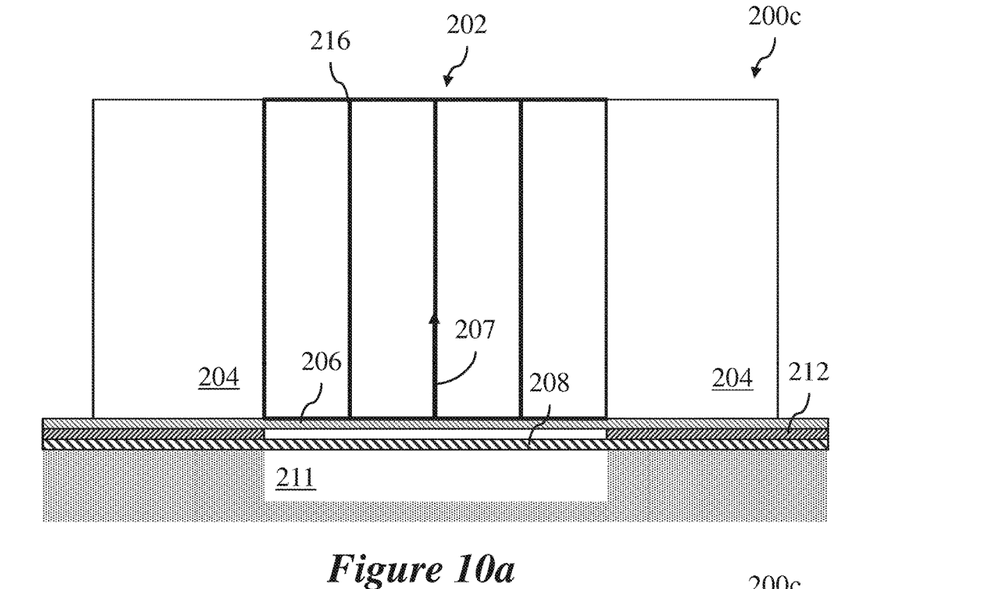
FIGS. 10a and 10b illustrate a cross-sectional view and a top view, respectively, of a further embodiment pressure sensor structure.
Figure 10B:
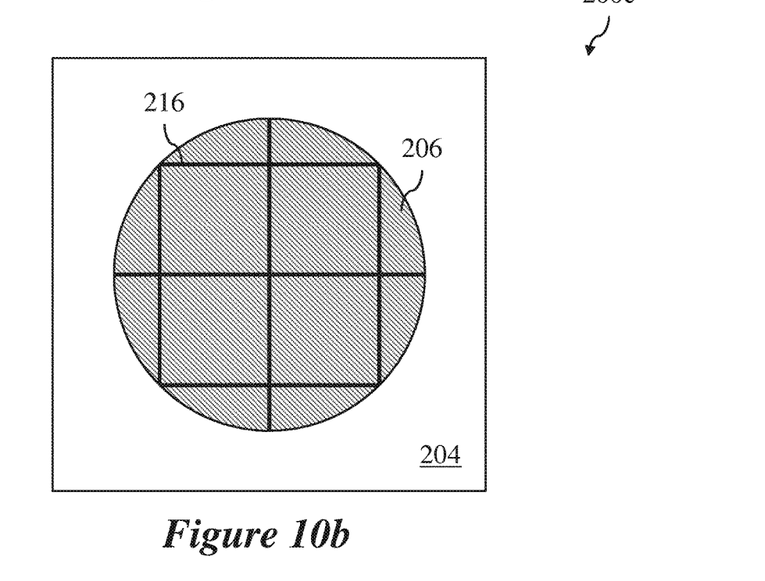

FIGS. 10a and 10b illustrate a cross-sectional view and a top view, respectively, of a further embodiment pressure sensor structure 200C including pressure port 202, guide structure 204, sensing membrane 206, sensing structure 208, and guide grid 216 formed in guide structure 204. According to various embodiments, guide grid 216 further increases the preferential reception of pressure waves traveling parallel to normal 207 and increase the rejection of pressure waves traveling perpendicular to normal 207. Figure boa shows a side view of guide grid 216 and Figure bob shows a top view of guide grid 216. In various embodiments, guide grid 216 is a rectangular grid forming rectangular cylindrical paths to membrane 206. In other embodiments, guide grid 216 may be configured with other shapes including any path to membrane 206. Further, guide grid 216 may be formed of a polymer, metal, or semiconductor material, for example. In some embodiments, guide grid 216 is formed of the same material as guide structure 204.

Figure 11:
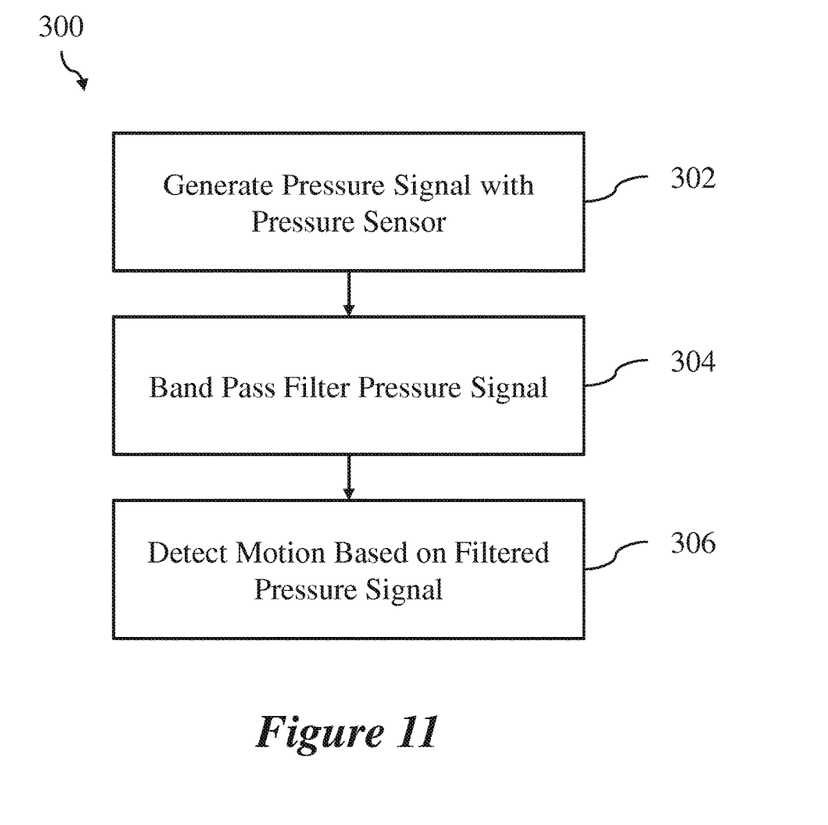
FIG. 11 illustrates a block diagram of an embodiment method of sensing motion.

FIG. 11 illustrates a block diagram of an embodiment method of sensing motion 300 including steps 302-306. According to various embodiments, step 302 includes generating a pressure signal with the pressure sensor. The pressure sensor may be coupled to a structure that exhibits a reproducible motion in some embodiments. The pressure signal is band pass filtered in step 304. Step 306 includes detecting a motion based on the filtered pressure signal. Step 306 may include detecting the reproducible motion in some embodiments. In other embodiments, further modifications may be applied to method 300 and the steps may be performed in various other orders.

Figure 12:
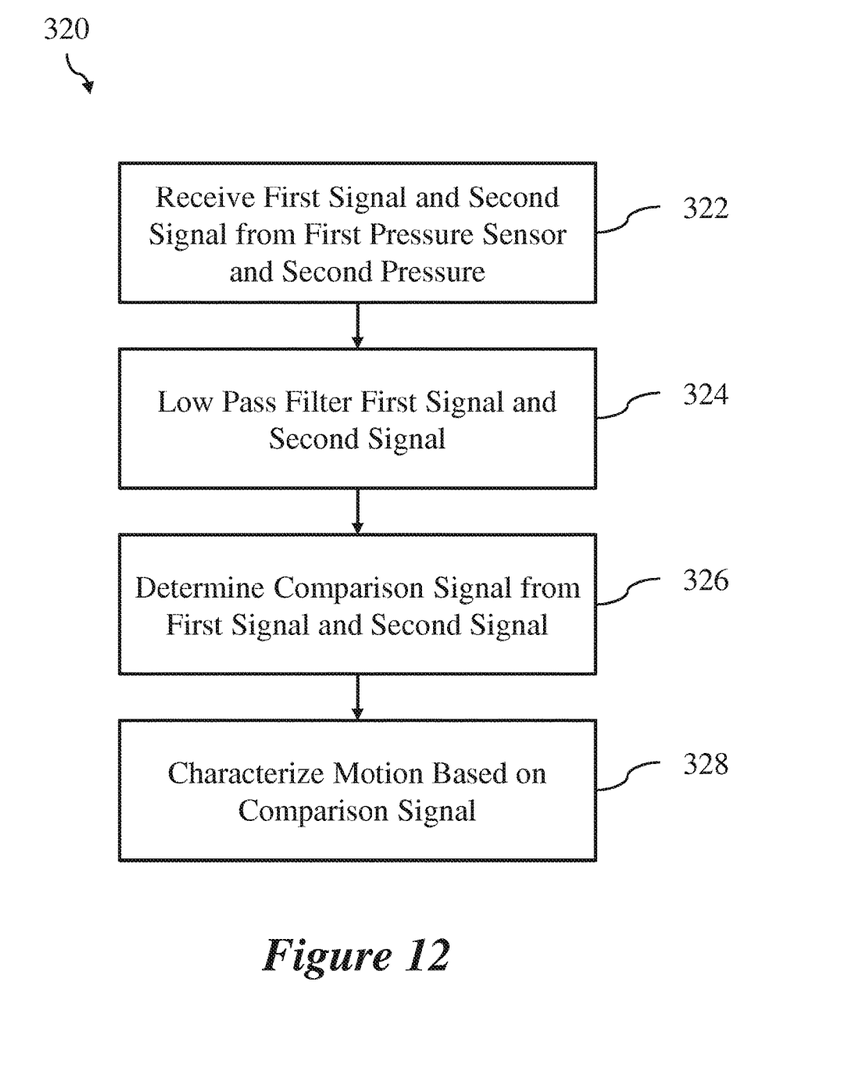
FIG. 12 illustrates a block diagram of another embodiment method of sensing motion.

FIG. 12 illustrates a block diagram of another embodiment method of sensing motion 320 including steps 322-328. According to various embodiments, step 322 includes receiving a first signal and a second signal from a first pressure sensor and a second pressure. Step 324 includes low pass filtering the first signal and second signal. Following step 324, step 326 includes determining a difference signal from the first signal and the second signal. In step 328, a motion is characterized based on the difference signal. In other embodiments, further modifications may be applied method 320 and the steps may be performed in various other orders.

Figure 13:
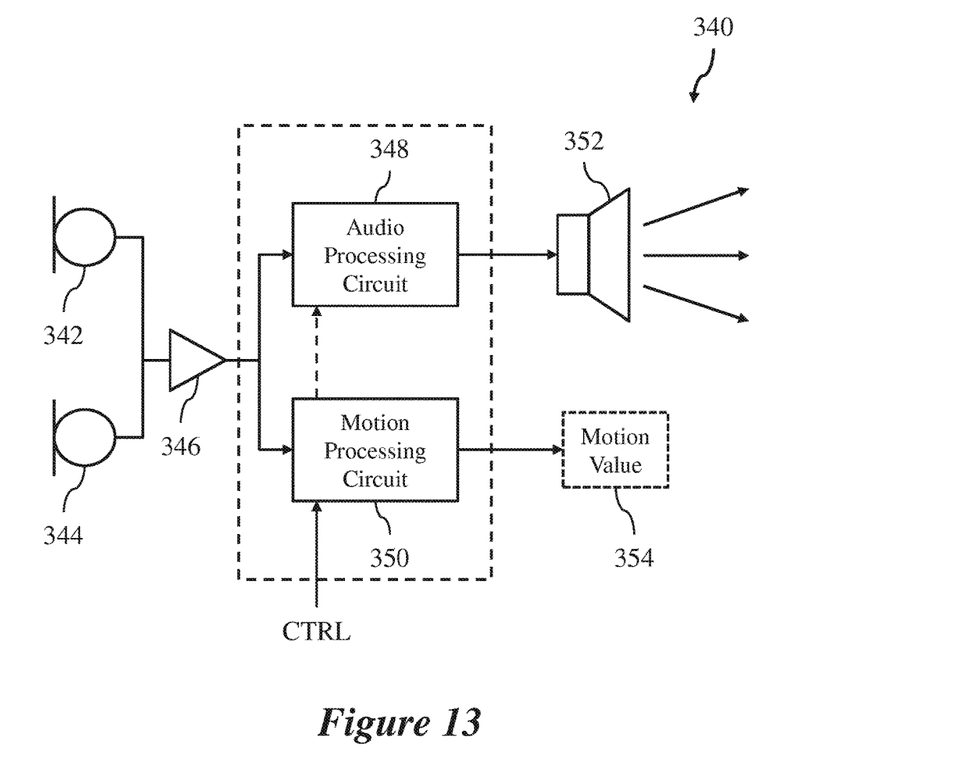
FIG. 13 illustrates a system block diagram of an embodiment MEMS microphone system.

FIG. 13 illustrates a system block diagram of an embodiment MEMS microphone system 340 including MEMS microphones 342 and 344 coupled to audio processing circuit 348 and motion processing circuit 350. According to various embodiments, MEMS microphone system 340 may be included in a mobile phone, tablet computer, or any other applications with microphones. MEMS microphones 342 and 344 receive pressure waves from an ambient environment and transduce the pressure waves to electrical signals. The electrical pressure signals are processed by audio processing circuit 348 and motion processing circuit 350. In various embodiments, motion processing circuit 350 may include filtering circuits, comparison circuits, and a signal processor for generating motion value 354 related to a determined motion based on pressure signals received at MEMS microphones 342 and 344. Motion processing circuit 350 may function and include components as described above in reference to FIGS. 3 and 4 above.

In various embodiments, audio processing circuit 348 may include a filter and other audio processing circuits commonly used for microphone signal processing. Audio processing circuit 348 supplies audio signals to speaker 352 or another component configured to receive audio signals.

Audio processing circuit 348 may filter the electrical pressure signals received from MEMS microphones 342 and 344 according to an audio band, passing frequencies between, for example, 500 Hz and 25 kHz. Similarly, motion processing circuit 350 may filter the electrical pressure signals received from MEMS microphones 342 and 344 according to a motion relevant band, passing frequencies between, for example, 0.5 Hz and 10 Hz. Other frequency bands may be used for both audio processing circuit 348 and motion processing circuit 350 in other embodiments.

According to various embodiments, control signal CTRL may enable or disable audio processing circuit 348 and motion processing circuit 350. MEMS microphone system 340 may include an amplifier 346 coupled to MEMS microphones 342 and 344. In various embodiments, any number of MEMS microphones may be included, such as 1, 2, 3, or 6 for example, and each may be coupled to an amplifier. In some embodiments, amplifiers, MEMS microphones, or processing circuits, such as low pass or band pass filters, may be included on a single integrated circuit (IC) or multiple ICs. MEMS microphone system 340 may include any number of ICs or processors.

According to an embodiment, a method of sensing motion includes receiving a first signal from a first pressure sensor and a second signal from a second pressure sensor, comparing the first signal and the second signal, and characterizing a motion based on the comparing.

In various embodiments, the method of sensing motion further includes low pass filtering the first signal and second signal. Low pass filtering may include passing frequencies below 10 Hz. In some embodiments, the method includes receiving a third signal from a third pressure sensor and comparing the first signal, second signal, and third signal. Comparing the first signal and the second signal may include determining a difference signal between the first signal and the second signal.

In various embodiments, the method of sensing motion further includes generating the first signal at a first deflectable membrane and a first sensing structure formed adjacent the first deflectable membrane and generating the second signal at a second deflectable membrane and a second sensing structure formed adjacent the second deflectable membrane. The method may also include receiving pressure waves in a first pressure port coupled to the first membrane and having a length extending away from the first membrane at least three times greater than a longest dimension of the first membrane. The method may further include receiving pressure waves in a second pressure port coupled to the second membrane and having a length extending away from the second membrane at least three times greater than a longest dimension of the second membrane.

According to an embodiment, a motion sensor includes a plurality of pressure sensors and a motion detection circuit coupled to the plurality of pressure sensors. Each of the plurality of pressure sensors includes a membrane having a planar surface with a normal pointing in a different direction and the plurality of pressure sensors are configured to generate pressure signals based on deflections of each membrane. The motion detection circuit is configured to receive the pressure signals from the plurality of pressure sensors, compare the pressure signals to each other, and characterize a motion based on comparing the pressure signals to each other.

In various embodiments, the motion detection circuit includes a low pass filter configured to low pass filter the pressure signals before comparing the pressure signals to each other. The low pass filter may be configured to pass frequencies below 10 Hz. The plurality of pressure sensors may include two pressure sensors. The plurality of pressure sensors may include three pressure sensors. In some embodiments each pressure sensor of the plurality of pressure sensors includes a sound port having a first length in a direction parallel to the respective normal at least three times longer than a longest dimension of the respective membrane. At least one sound port may be filled with foam. At least one sound port may include a guide grid. The first length of at least one sound port may be at least ten times longer than a longest dimension of the respective membrane.

In various embodiments, each normal of the plurality of pressure sensors is orthogonal to each other normal of the plurality of pressure sensors. Each pressure sensor of the plurality of pressure sensors may be one of a group consisting of a static pressure sensor, a dynamic pressure sensor, and a microelectromechanical (MEMS) microphone.

According to an embodiment, a method of sensing motion includes generating a pressure signal with a pressure sensor, band pass filtering the pressure signal, and detecting a motion based on the filtered pressure signal. Band pass filtering includes passing a frequency band between 0.5 Hz and 50 Hz.

In various embodiments, band pass filtering includes passing a frequency band only between 0.5 Hz and 10 Hz. The pressure sensor may be coupled to a structure that exhibits a reproducible motion and detecting the motion may include detecting the reproducible motion. The pressure sensor may include a deflectable membrane formed adjacent to a sensing structure and configured to generate the pressure signal in response to deflections of the deflectable membrane. In some embodiments, the pressure sensor includes a pressure port coupled to the deflectable membrane. The pressure port has a length extending away from the membrane that is at least three times greater than a longest dimension of the membrane.

According to an embodiment, a microphone system includes a plurality of microelectromechanical system (MEMS) microphones including a plurality of signal outputs, a motion processing circuit coupled to the plurality of signal outputs, and an audio processing circuit coupled to the plurality of signal outputs. The signal outputs are configured to supply a plurality of pressure signals generated by the plurality of MEMS microphones. The motion processing circuit is configured to characterize motions of the microphone system based on the plurality of pressure signals. The audio processing circuit is configured to output an electrical audio signal based on the plurality of pressure signals.

In various embodiments, the motion processing circuit includes a low pass filter configured to pass frequencies below 10 Hz. The audio processing circuit may include a high pass filter configured to pass frequencies above 500 Hz. In some embodiments, the plurality of MEMS microphones includes only two MEMS microphones.

According to various embodiments described herein, advantages may include motion detection using pressure sensors or microphones, motion detection with decreased system cost, and measurement of velocity of a device based on measured pressure waves. In embodiments including microphone systems, such as cellular phones or tablets for example, advantages may include using multiple existing microphones that may be reconfigured to support both microphone functionality and motion sensor functionality without additional sound ports or pressure ports.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of sensing motion, comprising:
   generating a pressure signal with a pressure sensor;
   band pass filtering the pressure signal; and
   detecting a motion of the pressure sensor based on the filtered pressure signal.

2. The method of claim 1, wherein band pass filtering comprises passing a frequency band between 0.5 Hz and 10 Hz.

3. The method of claim 1, wherein band pass filtering passes a frequency band between 0.5 Hz and 50 Hz.

4. The method of claim 1, wherein the pressure sensor is coupled to a structure that exhibits a reproducible motion and detecting the motion comprises detecting the reproducible motion.

5. The method of claim 1, wherein the pressure sensor comprises a deflectable membrane formed adjacent to a sensing structure and configured to generate the pressure signal in response to deflections of the deflectable membrane.

6. The method of claim 5, wherein the pressure sensor further comprises a pressure port coupled to the deflectable membrane, wherein the pressure port has a length extending away from the deflectable membrane that is at least three times greater than a longest dimension of the deflectable membrane.

7. A device, comprising:
   a pressure sensor comprising a membrane having a planar surface, the pressure sensor being configured to generate a signal based on a deflection of the membrane; and
   a motion detection circuit coupled to the pressure sensor, the motion detection circuit being configured to:
      receive the signal from the pressure sensor;
      filter the pressure signal to produce a filtered pressure signal; and
      detect a motion of the pressure sensor based on the filtered pressure signal.

8. The device of claim 7, wherein the pressure sensor comprises a sound port of a first length in a direction parallel to a normal to the planar surface, the first length being at least three times longer than a longest dimension of the membrane.

9. The device of claim 8, wherein the sound port is filled with foam.

10. The device of claim 8, wherein the sound port comprises a guide grid.

11. The device of claim 8, wherein the first length is at least ten times longer than the longest dimension of the membrane.

12. The device of claim 7, wherein the motion detection circuit comprises a band pass filter configured to produce the filtered pressure signal, the band pass filter being configured to pass a frequency band between 0.5 Hz and 10 Hz.

13. The device of claim 12, wherein the band pass filter is configured to pass a frequency band between 0.5 Hz and 50 Hz.

14. The device of claim 7, further comprising a structure configured to exhibit a reproducible motion, and wherein the motion detection circuit is configured to detect the reproducible motion based on the filtered pressure signal.

15. A device, comprising:
   a pressure sensor configured to generate a pressure signal;
   a band pass filter configured to filter the pressure signal to produce a filtered pressure signal, the band pass filter being configured to pass frequencies between 0.5 Hz and 10 Hz; and
   a signal processing circuit configured to generate a motion value based on the filtered pressure signal, the motion value being indicative of a motion of the device.

16. The device of claim 15, wherein the device comprises at least one of a lever or a hinged lid.

17. The device of claim 15, wherein the band pass filter is configured to pass frequencies between 0.5 Hz and 50 Hz.

18. The device of claim 15, wherein the pressure sensor comprises a membrane having a planar surface and a sound port having a first length and extending in a direction parallel to a normal to the planar surface, the first length being at least three times longer than a longest dimension of the membrane.

19. The device of claim 18, wherein the sound port is filled with foam.

20. The device of claim 18, wherein the sound port comprises a guide grid.

* * * * *